Aug. 2, 1949.   T. NELSON   2,477,765
STUD FOR WELDING
Filed Dec. 21, 1944

INVENTOR
TED NELSON
BY Charles S. Evans
his ATTORNEY

Patented Aug. 2, 1949

2,477,765

UNITED STATES PATENT OFFICE 2,477,765

STUD FOR WELDING

Ted Nelson, San Leandro, Calif., assignor to Morton Gregory Corporation, a corporation of Michigan Application December 21, 1944, Serial No. 569,119

2 Claims. (Cl. 287—20.2)

My invention relates to the art of welding and particularly to a new type of stud.

One of the objects is the provision of a stud which is short enough to meet the requirements of its use, but lacks the length necessary for use in the devices with which it must be applied.

My invention possesses other objects and features of value, some of which with the foregoing will be set forth in the following description of the invention. It is to be understood that I do not limit myself to the showing made by the said description and the drawings as I may adopt variant forms of the invention within the scope of the appended claims.

In the drawings, which are on a somewhat enlarged scale,

Figure 1:
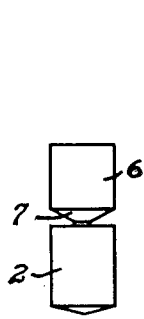
Figure 1 is an elevation of a stud embodying my invention.

In many kinds of construction work, it is desirable to weld to a backing or foundation plate or body very short studs. Sometimes these studs are threaded to receive a bracket or fitting; sometimes they are merely spacing elements to which a cover or wall plate is secured; and sometimes such studs are used on machine parts to supply a need which is difficult to provide for in molding or machining or which would unduly complicate a pattern or mold and which therefore are welded in place after the part is made otherwise.

In terms of broad inclusion, the device of my invention comprises two parts, the stud proper and a shank integral therewith. The stud proper which is to be welded to its supporting base or plate has a length which is determined by its function or use; and a shank integrally connected to the stud and whose sole function is to provide a means by which the stud may be handled and which is readily separated from the stud and discarded after the stud is welded.

To meet the requirements of construction, it is sometimes necessary to use a stud so short that it cannot be held in the chuck of the welding gun and still be surrounded during the welding operation with the ceramic ferrule which is necessary for the best welding results. In ordinary welding of studs to an underlying body or base plate, where the length of the welded stud is not too short, the standard welding gun and ferrule described in my United States Letters Patent respectively 2,287,818 and Reissue 22,411 may be used, the gun chuck being pulled free from the stud after the welding is completed, the stud then remaining in place to serve its intended function. In this case, the length of the stud must be long enough to be seated in the chuck and provide room for the ferrule about the welded end together with the ferrule holding spring, such an assembly being shown in my above named reissue patent or in Patent No. 2,355,099.

When the length of the finished stud is too short to accommodate the ferrule, spring and chuck assembly, a special form of stud embodying my present invention is provided; and in cases where stud material is important, a slightly modified shape of chuck is also provided to handle the stud.

Referring now to the drawings, one of the embodiments of my present invention comprises a stud 2, which for purposes of explanation will be assumed to have a length somewhat greater than its diameter. This is slightly longer than the finished stud will project from the base plate, since some of the stud is consumed during the welding operation. It may be assumed that the stud after welding is to serve the purpose of spacing two wall plates 3 and 4 apart, as shown in Figure 5, the spacing between the plates being approximately ⅛" less than the over-all length of the stud 2, the difference being represented by the shortening of the stud in the welding operation.

Extending from the rear end of the stud is a shank 6 of the same diameter as the stud and separated therefrom by a neck 7, tapering down from the shank to relatively small diameter as it joins the stud. The end face 8 of the stud is a flat or plane surface perpendicular to the longitudinal axis of the stud and shank; but preferably, especially for the larger diameter of studs, is slightly undercut as at 9 immediately around the juncture of the neck with the stud. The purpose of the undercutting is to leave the major portion of the surface 8 of the stud flat and without projections when the shank is knocked off after the stud has been welded to the base plate. For the smaller sizes of studs, the undercutting is not necessary. The size of the small portion of the neck is dictated by two main considerations. It must of course be of sufficient diameter to maintain complete integrity between stud and shank during handling and welding; and it must have a cross-sectional area sufficient to carry the welding current.

Figure 5:
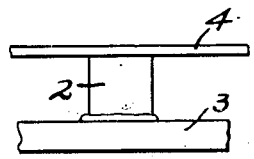
Figure 5 is an elevation showing the stud of Figure 1 welded to a base plate and serving to space and support an overlying plate.
Figure 6:
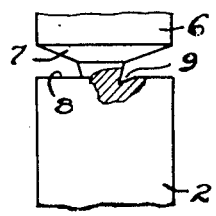
Figure 6 is an elevation on an enlarged scale of a stud embodying a different construction.

The stud just described may be utilized to space two walls apart as shown in Figure 5; and in such a use the studs are welded at desirable intervals over the face of the wall or base plate 3 and following completion of each weld, the shank is tapped with a hammer to separate it from the stud, leaving the stud in a position to receive the other wall plate 4 which may be secured to the stud by any desirable means or by the type of spot welding disclosed in my copending application Serial No. 569,118, executed before Glenn H. Spencer, a notary public in and for the county of Alameda, State of California, on December 7, 1944, and filed on the same day as this application.

Figure 3:
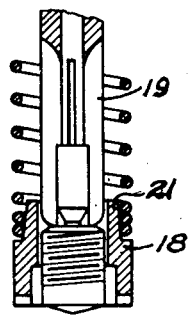
Figure 3 is an elevation partly in vertical section showing a stud similar to that of Figure 2 held in the chuck of a welding gun and surrounded with the ceramic ferrule which should be used to give the best results.
Figure 2:
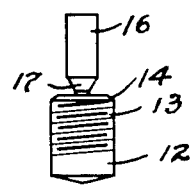
Figure 2 is an elevation of another embodiment of my invention.
Figure 4:
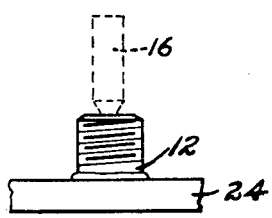
Figure 4 is an elevation showing the stud of Figure 2 after it has been welded to a base plate.

Sometimes a short lug or stud projecting from a base plate or machine body is required to be threaded to receive another part; and such an application is illustrated in Figure 4. Such a stud and shank is shown in Figure 2 and its assembly in the welding gun chuck is shown in Figure 3. It will be assumed also in this case that it is an object to save material or that the length of the stud and its diameter are such that a smaller diameter shank is necessary for inclusion in the chuck and ferrule assembly.

This embodiment of my invention, as shown in Figures 2 and 3, comprises a stud 12, provided with threads 13 if required by the use for which the stud is intended. The edge 14 of the stud is bevelled as an aid to the formation of readily engageable threads; and a shank 16 of materially less diameter than the stud is formed integrally with the stud and connected thereto by a reduced neck 17 extending from the center of the stud and tapering outwardly to the shank body.

Since the length of the stud is less than the overall height of the ferrule 18 with which it is used, the diameter of the shank is made small enough to be held in chuck jaws 19 of the welding gun. The outside diameter of the chuck jaws 19 is not materially greater than the diameter of the stud, so that the ends of the jaws may extend down into the neck 21 of the ferrule, as shown in Figure 3. The stud is welded to the supporting plate or underlying body 24 in the manner made clear in my above mentioned patents; and after the shank has been knocked off, appears as in Figure 4, ready to receive its intended fitting.

I claim:

1. A welding stud comprising a cylindrical head for welding to another body, and a cylindrical shank for holding the head in the chuck of a welding implement and having a conical neck frangibly connected to the head at its small end.

2. A welding stud comprising a cylindrical head for welding to another body, and a cylindrical shank for holding the head in the chuck of a welding implement and having a conical neck frangibly connected to the head at its small end, the point of connection being undercut below the plane of the head end.

TED NELSON.

REFERENCES CITED

The following references are of record in the file of this patent:

UNITED STATES PATENTS

| Number | Name | Date |
| --- | --- | --- |
| 978,652 | Rodger | Dec. 13, 1910 |
| 1,352,851 | Trumbull | Sept. 14, 1920 |
| 1,978,178 | Taylor | Oct. 23, 1934 |
| 2,289,785 | Hutchison, Jr. | July 14, 1942 |